United States Patent
Park et al.

(10) Patent No.: US 10,127,638 B2
(45) Date of Patent: Nov. 13, 2018

(54) IMAGE HAZE REMOVING APPARATUS AND METHOD OF REMOVING IMAGE HAZE

(71) Applicant: Samsung Electronics Co., Ltd., Suwon-si, Gyeonggi-do (KR)

(72) Inventors: Rae-Hong Park, Seoul (KR); Hyeon-Jin Ahn, Seoul (KR); Dong-Won Jang, Seoul (KR)

(73) Assignees: SAMSUNG ELECTRONICS CO., LTD., Gyeonggi-do (KR); SOGANG UNIVERSITY RESEARCH FOUNDATION, Seoul (KR)

( * ) Notice: Subject to any disclaimer, the term of this patent is extended or adjusted under 35 U.S.C. 154(b) by 102 days.

(21) Appl. No.: 15/262,408

(22) Filed: Sep. 12, 2016

(65) Prior Publication Data

US 2017/0084005 A1 Mar. 23, 2017

(30) Foreign Application Priority Data

Sep. 18, 2015 (KR) .................. 10-2015-0132025

(51) Int. Cl.
*G06K 9/40* (2006.01)
*G06T 5/00* (2006.01)
(Continued)

(52) U.S. Cl.
CPC ............... *G06T 5/002* (2013.01); *G06T 5/10* (2013.01); *G06T 7/60* (2013.01);
(Continued)

(58) Field of Classification Search
CPC . G06T 2207/20064; G06T 5/10; G06T 5/002; G06T 2207/10024;
(Continued)

(56) References Cited

U.S. PATENT DOCUMENTS 8,290,294 B2 10/2012 Kopf et al.
8,340,461 B2 12/2012 Sun et al.
(Continued)

FOREIGN PATENT DOCUMENTS

CN 103971337 A 8/2014

OTHER PUBLICATIONS

Du, et al. "Haze detection and removal in high resolution satellite image with wavelet analysis", IEEE, pp. 210-217, Jan. 2002.*

*Primary Examiner* — Daniel Mariam
(74) *Attorney, Agent, or Firm* — Harness, Dickey & Pierce, P.L.C.

(57) ABSTRACT

An image haze removing apparatus includes at least a transmission coefficient generator, a low pass filter, a particle size parameter estimator, a transmission coefficient divider and a real image estimator. The transmission coefficient generator generates a transmission coefficient based on a captured image. The low pass filter outputs a low frequency image, which includes a low frequency component of the captured image. The particle size parameter estimator estimates a particle size parameter based on the low frequency image. The transmission coefficient divider divides the transmission coefficient based on the particle size parameter to generate first to third divided transmission coefficients, which correspond to red, green and blue data of the captured image, respectively. The real image estimator estimates a real image by applying the first to third divided transmission coefficients to the red, green and blue data of the captured image, respectively.

20 Claims, 11 Drawing Sheets

(51) Int. Cl.
*G06T 5/10* (2006.01)
*G06T 7/60* (2017.01)

(52) U.S. Cl.
CPC .............. *G06T 2207/10024* (2013.01); *G06T 2207/20024* (2013.01); *G06T 2207/20052* (2013.01); *G06T 2207/20064* (2013.01)

(58) Field of Classification Search
CPC . G06T 2207/20024; G06T 2207/20052; G06T 7/60
USPC ........................................................ 382/275
See application file for complete search history.

(56) References Cited

U.S. PATENT DOCUMENTS

| | | |
|---|---|---|
| 8,350,933 B2 | 1/2013 | Fattal |
| 8,755,628 B2 | 6/2014 | Fang et al. |
| 8,837,857 B2 | 9/2014 | Hartley et al. |
| 8,970,691 B2 * | 3/2015 | Omer ...................... G06T 5/008 345/419 |
| 9,361,670 B2 * | 6/2016 | Huang ..................... G06T 5/002 |
| 9,508,126 B2 * | 11/2016 | Yang ......................... G06T 5/10 |
| 2011/0043603 A1 | 2/2011 | Schechner et al. |
| 2013/0050472 A1 | 2/2013 | Omer et al. |
| 2014/0140619 A1 | 5/2014 | Mukhopadhyay et al. |
| 2017/0178297 A1 * | 6/2017 | Fattal ...................... G06T 5/003 |

* cited by examiner

RGB FOGGY

R FOGGY

G FOGGY

B FOGGY

RGB THIN HAZE

R THIN HAZE

G THIN HAZE

B THIN HAZE

IMAGE HAZE REMOVING APPARATUS AND METHOD OF REMOVING IMAGE HAZE

CROSS-REFERENCE TO RELATED APPLICATION

This application claims priority under 35 USC § 119 to Korean Patent Application No. 10-2015-0132025, filed on Sep. 18, 2015 in the Korean Intellectual Property Office (KIPO), the contents of which are herein incorporated by reference in their entirety.

BACKGROUND

1. Technical Field

Example embodiments generally relate to methods of removing image haze and/or image haze removing apparatuses such as image haze removing apparatuses that are configured to recover images based on a correlation between red data and blue data of captured images.

2. Description of the Related Art

When a conventional image capturing device (e.g., a digital camera) takes a real image, a haze may be generated on the captured image according to a degree of scattering of light due to articles of an atmosphere. In addition, a degree of haze may vary based on a distance between the image capturing device and a subject and a size of the articles of atmosphere.

SUMMARY

When capturing a real image, the size of the articles of an atmosphere is an important variable for purposes of determining the degree of the haze. However, since it is hard to determine the size of the articles of the atmosphere, it is hard to remove the haze in the captured images according to the size of the articles of the atmosphere.

Accordingly, inventive concepts are provided to substantially obviate one or more problems due to limitations and disadvantages of the related art.

Some example embodiments provide image haze removing apparatuses that remove haze in captured images using transmission coefficients that are applied to red data, green data and blue data of the captured images. The transmission coefficients are determined based on at least an estimated size of a particle of an atmosphere. The size of the particle of the atmosphere is estimated using a correlation coefficient between the red data and the blue data.

Some example embodiments provide a method of removing haze in the captured images using transmission coefficients respectively applied to red data, green data and blue data of the captured images. The transmission coefficients are determined based on at least an estimated size of a particle of an atmosphere. The size of the particle of the atmosphere is estimated using a correlation coefficient between the red data and the blue data.

According to at least some example embodiments, an image haze removing apparatus may include at least a transmission coefficient generator, a low pass filter, a particle size parameter estimator, a transmission coefficient divider and a real image estimator. The transmission coefficient generator may be configured to generate an image transmission coefficient based on a captured image. The low pass filter may be configured to output a low frequency image based on the captured image, the low frequency image including a low frequency component of the captured image. The particle size parameter estimator may be configured to estimate a particle size parameter based on the low frequency image, the particle size parameter corresponding to a size of a particle of an atmosphere. The image transmission coefficient divider may be configured to divide the image transmission coefficient based on the particle size parameter, and may be configured to generate a first image divided transmission coefficient corresponding to red data of the captured image, a second divided image transmission coefficient corresponding to blue data of the captured image, and a third divided image transmission coefficient corresponding to blue data of the captured image. The real image estimator may be configured to estimate a real image by applying the first image divided transmission coefficient to the red data of the captured image, the second divided image transmission coefficient to the green data of the captured image, and the third image divided transmission coefficient to the blue data of the captured image.

In an example embodiment, the particle size estimator may be configured to estimate the particle size parameter based on a correlation coefficient between red data of the low frequency image and green data of the low frequency image.

In an example embodiment, wherein when the correlation coefficient increases, the particle size estimator is configured to decrease the particle size parameter, and the transmission coefficient divider is configured to decrease differences among the first divided image transmission coefficient, the second divided image transmission coefficient, and the third divided image transmission coefficient.

In an example embodiment, when the correlation coefficient decreases, the particle size estimator is configured to increase the particle size parameter, and the transmission coefficient divider is configured to increase differences among the first divided image transmission coefficient, the second divided image transmission coefficient, and the third divided image transmission coefficient.

In an example embodiment, the particle size estimator is configured to (i) determine a value of the correlation coefficient to be between zero and one; and (ii) determine a value of the particle size parameter to be between zero and four.

In an example embodiment, wherein the particle size estimator may be configured to estimate the size of the particle of the atmosphere as a maximum value when the particle size parameter has a minimum value, and estimate the captured image is associated with a first type of day based on the size of the particle of the atmosphere being a maximum value.

In an example embodiment, wherein the particle size estimator may be configured to estimate the size of the particle of the atmosphere as a minimum value when the particle size parameter has a maximum value, and estimate the captured image is associated with a second type of day based on the size of the particle of the atmosphere being a minimum value.

In an example embodiment, wherein the particle size estimator may comprises a correlation coefficient generator and a particle size parameter generator. The correlation coefficient generator may be configured to generate a correlation coefficient between red data of the low frequency image and blue data of the low frequency image. The particle size parameter generator configured to generate the particle size parameter based on the correlation coefficient.

In an example embodiment, the correlation coefficient may be a Pearson correlation coefficient between the red data of the low frequency image and the blue data of the low frequency image.

In an example embodiment, wherein the particle size parameter generator may be configured to determine the particle size parameter using a hyperbolic sine function of the correlation coefficient.

In an example embodiment, wherein the low pass filter may be configured to output the low frequency image using a discrete wavelet transform.

In an example embodiment, the low pass filter may output the low frequency image using a discrete cosine transform.

In an example embodiment, wherein the image transmission coefficient may include a plurality of pixel transmission coefficients corresponding to a plurality of pixel coordinates of the captured image. At least one of the plurality of pixel transmission coefficients corresponding to at least one of the plurality of pixel coordinates based on pixel data of an area of the captured image, the area including the at least one of the plurality of pixel coordinates and an atmosphere constant extracted from the whole captured image.

In an example embodiment, the real image estimator may be configured to estimate the red data of the real image based on (i) the red data of the captured image, (ii) an atmosphere constant extracted from the captured image, and (iii) the first divided transmission coefficient. The real image estimator may be further configured to estimate green data of the real image based on (i) the green data of the captured image, (ii) the atmosphere constant, and (iii) the second divided transmission coefficient. The real image estimator may be further configured to estimate blue data of the real image based on (i) the blue data of the captured image, (ii) the atmosphere constant, and (iii) the third divided transmission coefficient.

According to example embodiments, a method of removing image haze includes generating a transmission coefficient based on a captured image, outputting a low frequency image based on the captured image, the low frequency image including a low frequency component of the captured image, estimating a particle size parameter based on the low frequency image, the particle size parameter corresponding to a size of a particle of atmosphere, dividing the transmission coefficient based on the particle size parameter to generate a first divided transmission coefficient, a second divided transmission coefficient and a third divided transmission coefficient, the first divided transmission coefficient corresponding to red data of the captured image, the second divided transmission coefficient corresponding to green data of the captured image, and the third divided transmission coefficient corresponding blue data of the captured image; and estimating a real image by respectively applying the first divided transmission coefficient to the red data, applying the second divided transmission coefficient to the green data, and applying the third divided transmission coefficient to the blue data.

In an example embodiment, the estimating the particle size parameter may include generating a correlation coefficient between red data of the low frequency image and blue data of the low frequency image, and generating the particle size parameter based on the correlation coefficient.

In an example embodiment, the estimating the real image may include estimating red data of the real image based on (i) the red data of the captured image, (ii) an atmosphere constant extracted from the captured image and (iii) the first divided transmission coefficient; estimating green data of the real image based on (i) the green data of the captured image, (ii) the atmosphere constant and (iii) the second divided transmission coefficient; and estimating blue data of the real image based on (i) the blue data of the captured image, (ii) the atmosphere constant and (iii) the third divided transmission coefficient.

According to the image haze removing apparatus and the method of removing image haze, the size of the particle of atmosphere is estimated using a correlation coefficient between the red data and the blue data. The real image is estimated using the transmission coefficients may be applied to red data, green data and blue data of the captured image, respectively, and varied according to the estimated size of the particle. Thus, the image haze may be removed than the conventional method of removing the image haze.

According to example embodiments, an apparatus for removing haze in an image, comprises a memory having computer readable instructions stored thereon; and at least one processor configured to execute the computer readable instructions to, receive a particle size parameter based on a correlation coefficient between at least two data points of a low frequency image of a captured image, the correlation coefficient corresponding to a size of a particle of an atmosphere, generate a plurality of divided transmission coefficients of the captured image based on the received particle size parameter, and generate a real image of the captured image based on the divided transmission coefficients.

According to example embodiments, the plurality of divided transmission coefficients includes a first divided transmission coefficient corresponding to red data of the captured image, a second divided transmission coefficient correspond to green data of the captured image, and a third divided transmission coefficient corresponding to blue data of the captured image.

According to example embodiments, wherein the at least one processor is further configured to, estimate red data of the real image based on the red data of the captured image, an atmosphere constant extracted from the captured image, and the first divided transmission coefficient; estimate green data of the real image based on the green data of the captured image, the atmosphere constant, and the second divided transmission coefficient; and estimate blue data of the real image based on the blue data of the captured image, the atmosphere constant, and the third divided transmission coefficient.

According to example embodiments, wherein the at least one processor is further configured to execute the computer readable instructions to, generate the particle size parameter based on the correlation coefficient between red data of the low frequency image and blue data of the low frequency image. The correlation coefficient may be a Pearson correlation coefficient between the at least two data points, the at least two data points include red data and blue data.

BRIEF DESCRIPTION OF THE DRAWINGS

Illustrative, non-limiting example embodiments will be more clearly understood from the following detailed description taken in conjunction with the accompanying drawings. The drawings are not necessarily to scale, emphasis instead being placed upon illustrating principles of inventive concepts. In the drawings.

DETAILED DESCRIPTION OF EXAMPLE EMBODIMENTS

Figure 1:
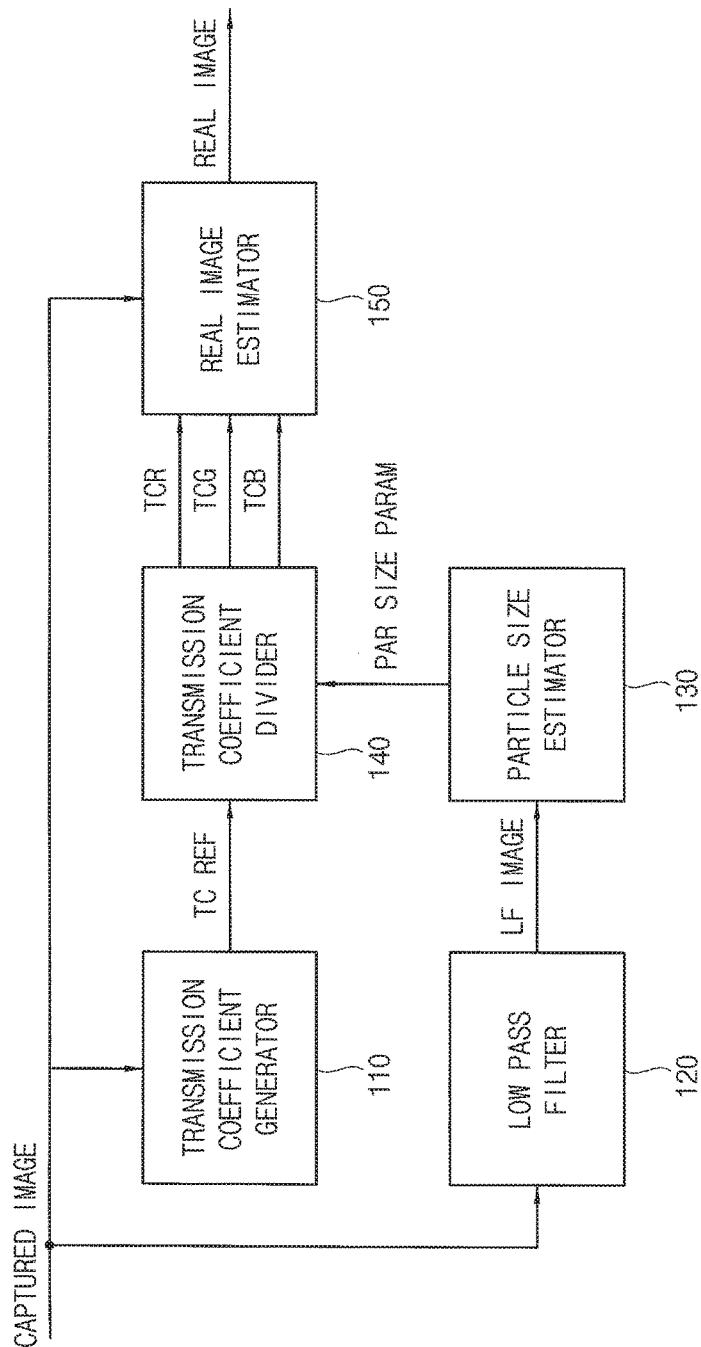
FIG. 1 is a block diagram illustrating an image haze removing apparatus according to an example embodiment.

Various example embodiments will be described more fully with reference to the accompanying drawings, in which some example embodiments are shown. Example embodiments may, however, be embodied in many different forms and should not be construed as being limited to the embodiments set forth herein.

Rather, these example embodiments are provided so that this disclosure will be thorough and complete, and will fully convey the scope of example embodiments of inventive concepts to those skilled in the art. Like reference characters and/or numerals in the drawings refer to like elements, and thus their description may not be repeated throughout this application.

It will be understood that, although the terms "first," "second," etc. may be used herein to describe various elements. These elements should not be limited by these terms. These terms are only used to distinguish one element from another. For example, a first element could be termed a second element, and, similarly, a second element, could be termed a first element, without departing from the teachings of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments of inventive concepts will be explained in detail with reference to the accompanying drawings.

FIG. 1 is a block diagram illustrating an image haze removing apparatus according to an example embodiment.

Referring to FIG. 1, the image haze removing apparatus 100 may include at least a transmission coefficient generator 110, a low pass filter 120, a particle size estimator 130, a transmission coefficient divider 140 and a real image estimator 150.

The transmission coefficient generator 110 generates a transmission coefficient TC REF based on a captured image. An operation of the transmission coefficient generator 110 is explained in further detail below with respect to FIG. 2.

The low pass filter 120 outputs a low frequency image LF IMAGE. The low frequency image LF IMAGE includes a low frequency component of the captured image. Correlation between red data and blue data is outstanding in a low frequency area so that the low pass filter 120 outputs the low frequency image LF IMAGE, which is generated by low pass filtering, to the particle size estimator 130.

Figure 3:
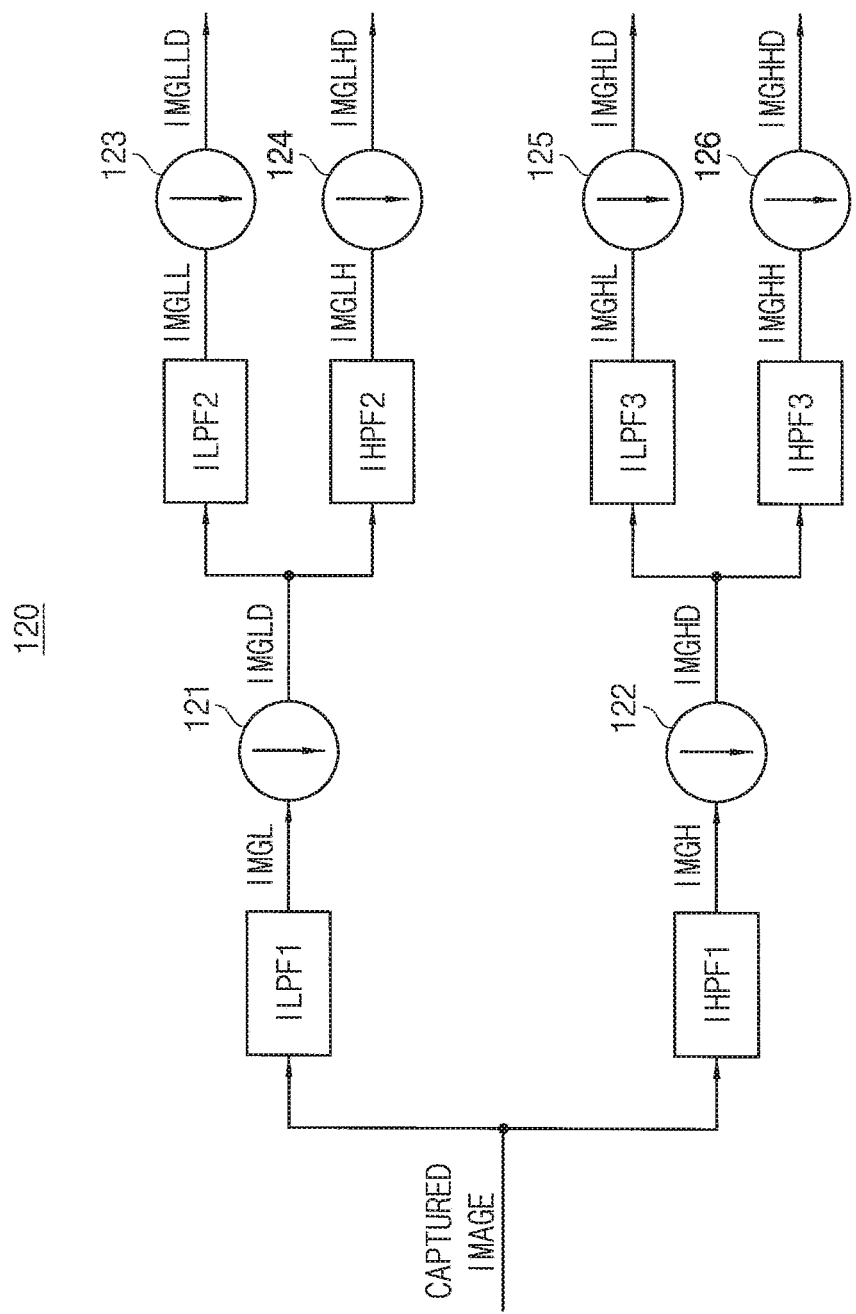
FIG. 3 is a block diagram illustrating a low pass filter of the image haze removing apparatus of FIG. 1 according to an example embodiment.
Figure 4:
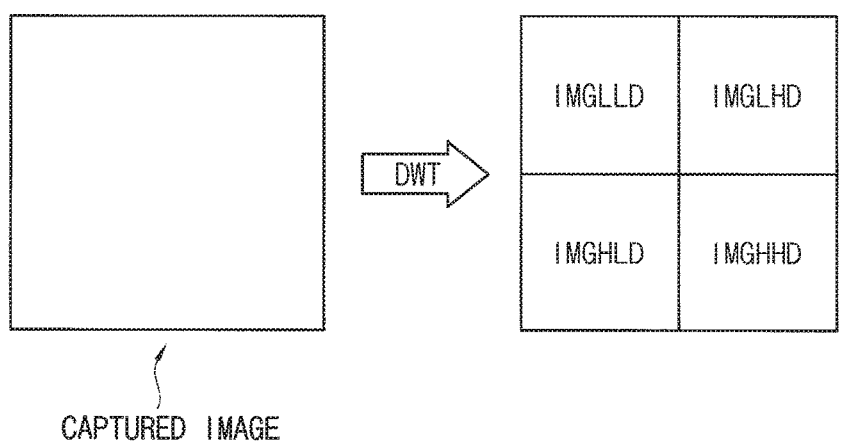
FIG. 4 is a conceptual diagram illustrating an operation of the low pass filter of FIG. 3 according to an example embodiment.

In an example embodiment, the low pass filter 120 may output the low frequency image LF IMAGE using discrete wavelet transform ("DWT"). An operation of the low pass filter 120 outputting the low frequency image LF IMAGE using the discrete wavelet transform is explained in detail below with reference to FIGS. 3 and 4. Alternatively, the low pass filter 120 may output the low frequency image LF IMAGE using discrete cosine transform ("DCT"). An operation of the low pass filter 120 outputting the low frequency image LF IMAGE using the discrete cosine transform is illustrated in FIGS. 3 and 4 such that the explanation of the operation of the low pass filter 120 outputting the low frequency image LF IMAGE using the discrete cosine transform is omitted. Alternatively, the low pass filter 120 may output the low frequency image LF IMAGE using other transforms except for the discrete wavelet transform and the discrete cosine transform.

Still referring to FIG. 1, the particle size estimator 130 estimates a particle size parameter PAR SIZE PARAM, which corresponds to the size of the particle in atmosphere when the captured image is captured. The particle size estimator 130 estimates the particle size parameter PAR SIZE PARAM based on the low frequency image LF IMAGE. In an example embodiment, the particle size estimator 130 may estimate the particle size parameter PAR SIZE PARAM based on a correlation coefficient between the red data and the blue data of the low frequency image LF IMAGE.

When similarity between the red data of the low frequency image LF IMAGE and the blue data of the low frequency image LF IMAGE increases, the correlation coefficient increases. When the correlation coefficient increases, the size of the particle increases. When the correlation coefficient increases, the particle size parameter PAR SIZE PARAM decreases. The size of the particle may be inversely proportional to the particle size parameter PAR SIZE PARAM. When the correlation coefficient increases, differences among first to third divided transmission coefficients TCR, TCG and TCB decrease.

When a similarity between the red data of the low frequency image LF IMAGE and the blue data of the low frequency image LF IMAGE decreases, the correlation coefficient decreases. When the correlation coefficient decreases, the size of the particle decreases. When the correlation coefficient decreases, the particle size parameter PAR SIZE PARAM increases. When the correlation coefficient decreases, differences among the first to third divided transmission coefficients TCR, TCG and TCB increase.

Still referring to FIG. 1, when the particle size parameter PAR SIZE PARAM has a reduced (and/or minimum) value, the particle size estimator 130 estimates the size of the particle up to an increased (and/or maximum) value. When the particle size parameter PAR SIZE PARAM has the reduced (and/or minimum) value, the particle size estimator 130 estimates that the captured image is captured in a foggy day. When the particle size parameter PAR SIZE PARAM has an increased (and/or maximum) value, the particle size estimator 130 estimates the size of the particle to a reduced (and/or minimum) value. When the particle size parameter PAR SIZE PARAM has the increased (and/or maximum) value, the particle size estimator 130 estimates that the captured image is captured in a thin haze day. An operation of the particle size estimator 130 is explained in further detail in reference to FIGS. 6 to 9.

The transmission coefficient divider 140 divides the transmission coefficient TC REF and generates the first to third divided transmission coefficients TCR, TCG and TCB, which correspond to the red data of the captured image, the green data of the captured image and the blue data of the captured image, respectively. The real image estimator 150 estimates the real image by applying the first to third divided transmission coefficients TCR, TCG and TCB to the red data, the green data and the blue data of the captured image, respectively. That is, for example, the real image estimator 150 may estimate the red data of the real image based on the red data of the captured image, an atmosphere constant extracted from the whole captured image and the first divided transmission coefficients TCR. Furthermore, the real image estimator 150 may estimate green data of the real image based on the green data of the captured image, the atmosphere constant extracted from the whole captured image and the second divided transmission coefficients TCG. Lastly, the real image estimator 150 may estimate blue data of the real image based on the blue data of the captured image, the atmosphere constant extracted from the whole captured image and the third divided transmission coefficients TCB. Operations of the transmission coefficient divider 140 and the real image estimator 150 are explained in further detail with reference to FIG. 9.

Figure 2:
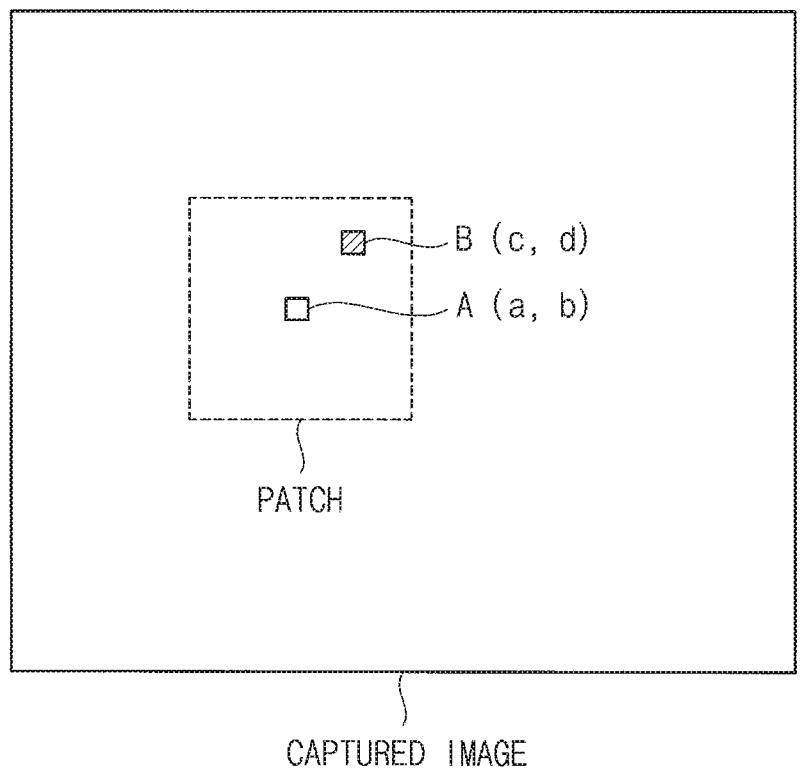
FIG. 2 is a conceptual diagram illustrating an operation of a transmission coefficient generator of the image haze removing apparatus of FIG. 1 according to an example embodiment.

FIG. 2 is a conceptual diagram illustrating an operation of the transmission coefficient generator 110 of the image haze removing apparatus 100 of FIG. 1.

Referring to FIG. 2, the transmission coefficient TC REF generated by the transmission coefficient generator 110 includes a plurality of pixel transmission coefficients. The pixel transmission coefficients may correspond to pixel coordinates of the captured image, respectively.

In an example embodiment, the transmission coefficient generator 110 may generate a pixel transmission coefficient corresponding to a first pixel A having coordinates (a, b) based on the red data, the green data and the blue data in a patch and the atmosphere constant. The patch includes the first pixel A having the coordinates of (a, b). For example, the transmission coefficient generator 110 may generate the transmission coefficient TC REF based on Equation 1.

$$t(x) = 1 - \min_{y \in PATCH(x)} \left( \min_c \frac{I^c(y)}{A^c} \right), c \in \{R, G, B\} \quad \text{[Equation 1]}$$

In Equation (1), t(x) is the pixel transmission coefficient for a pixel at coordinates in the captured image. PATCH(x) represents a patch including the pixel x. Furthermore, y represents a coordinate variable in the PATCH(x). $I^R(y)$ represents a red data value of y coordinate. $I^G(y)$ represents a green data value of y coordinate. $I^B(y)$ represents a blue data value of y coordinate. $A^R$ represents an atmosphere constant extracted from the red data of the whole captured image. $A^G$ represents an atmosphere constant extracted from the green data of the whole captured image. $A^B$ represents an atmosphere constant extracted from the blue data of the whole captured image. The atmosphere constants $A^R$, $A^G$ and $A^B$, and a method of calculating the atmosphere constants $A^R$, $A^G$ and $A^B$ are known to a person having ordinary skilled in the art so that the explanation regarding the atmosphere constants $A^R$, $A^G$ and $A^B$ is omitted. Furthermore, in Equation (1), c represents a color variable, where c may be R (red), G (green) or B (blue).

The pixel transmission coefficient t(x) corresponding to x pixel coordinates may be determined by subtracting a reduced (and/or minimum) value among quotients, when the pixel data $I^c(y)$ in the patch PATCH(x) surrounding the x coordinate is divided by the atmosphere constant $A^c$, from one. The transmission coefficient generator 110 may move the pixel coordinate along axes of the captured image to determine all of the pixel transmission coefficients corresponding to the all pixels. In this way, the transmission coefficient generator 110 may determine the transmission coefficient TC REF, which is the set of the plurality of pixel transmission coefficients.

Alternatively, the transmission coefficient generator 110 may determine the transmission coefficient TC REF using other equations except for the above-mentioned Equation 1.

FIG. 3 is a block diagram illustrating the low pass filter 120 of the image haze removing apparatus 100 of FIG. 1.

FIG. 3 represents the low pass filter 120 outputting the low pass filter image LF IMAGE using the discrete wavelet transform.

The low pass filter 120 may include first to third inner low pass filters ILPF1, ILPF2 and ILPF3, first to third inner high pass filters IHPF1, IHPF2 and IHPF3, and first to sixth down samplers 121 to 126.

The first inner low pass filter ILPF1 performs a low pass filtering to the captured image to generate a first image IMGL. The first inner high pass filter IHPF1 performs a high pass filtering to the captured image to generate a second image IMGH. The first down sampler 121 performs a down sampling to the first image IMGL to generate a first down sampled image IMGLD. The second down sampler 122 performs a down sampling to the second image IMGH to generate a second down sampled image IMGHD.

The second inner low pass filter ILPF2 performs a low pass filtering to the first down sampled image IMGLD to generate a third image IMGLL. The second inner high pass filter IHPF2 performs a high pass filtering to the first down sampled image IMGLD to generate a fourth image IMGLH. The third down sampler 123 performs a down sampling to the third image IMGLL to generate a third down sampled image IMGLLD. The fourth down sampler 124 performs down sampling to the fourth image IMGLH to generate a fourth down sampled image IMGLHD. The third inner low pass filter ILPF3 performs a low pass filtering to the second down sampled image IMGHD to generate a fifth image IMGHL. The third inner high pass filter IHPF3 performs high pass filtering to the second down sampled image IMGHD to generate a sixth image IMGHH. The fifth down sampler 125 performs down sampling to the fifth image IMGHL to generate a fifth down sampled image IMGHLD. The sixth down sampler 126 performs down sampling to the sixth image IMGHH to generate a sixth down sampled image IMGHHD.

FIG. 4 is a conceptual diagram illustrating an operation of the low pass filter of FIG. 3.

Referring to FIG. 4, the low pass filter 120 may operate the discrete wavelet transform to generate the first down sampled image IMGLD, the second down sampled image IMGHD, the third down sampled image IMGLLD, the fourth down sampled image IMGLHD, the fifth down sampled image IMGHLD, and the sixth down sampled image IMGHHD.

Figure 5:
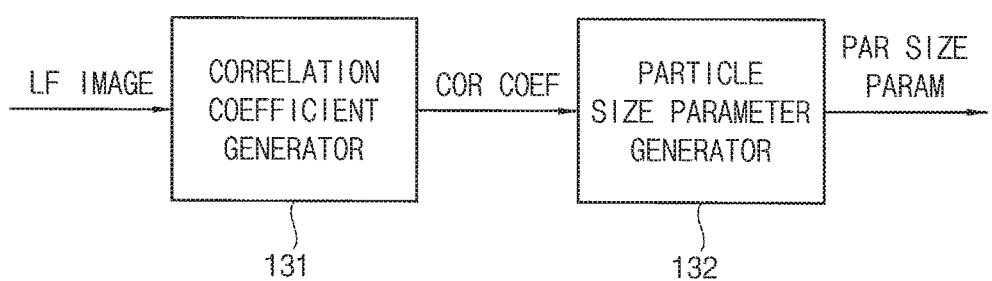
FIG. 5 is a particle size estimator of the image haze removing apparatus of FIG. 1 according to an example embodiment.

FIG. 5 is a particle size estimator 130 of the image haze removing apparatus 100 of FIG. 1.

Referring to FIG. 5, the particle size estimator 130 may include a correlation coefficient generator 131 and a particle size parameter generator 132.

The correlation coefficient generator 131 may generate the correlation coefficient COR COEF between the red data and the blue data of the low frequency image LF IMAGE. In an example embodiment, the correlation coefficient COR COEF may be a Pearson correlation coefficient between the red data and the blue data of the low frequency image LF IMAGE as following Equation 2.

$$\rho(R, B) = \frac{E[(R - \mu_R)(B - \mu_B)]}{\sigma_R \sigma_B} \quad \text{[Equation 2]}$$

Herein, $\rho(R, B)$ represents the Pearson correlation coefficient between the red data and the blue data of the low frequency image LF IMAGE. R represents a random variable of the red data of the pixels of the low frequency image LF IMAGE. B represents a random variable of the blue data of the pixels of the low frequency image LF IMAGE. $\mu_R$ represents an average of R. $\mu_B$ represents an average of B. $\sigma_R$ represents a standard deviation of R. $\sigma_B$ represents a standard deviation of B.

When the similarity between the red data of the low frequency image LF IMAGE and the blue data of the low frequency image LF IMAGE increases, the correlation coefficient COR COEF increases. By contrast, when the similarity between the red data of the low frequency image LF IMAGE and the blue data of the low frequency image LF IMAGE decreases, the correlation coefficient COR COEF decreases.

In an example embodiment, the correlation coefficient COR COEF may have a value between zero and one. The particle size parameter PAR SIZE PARAM may have a value between zero and four. When the correlation coefficient COR COEF is zero, the particle size parameter PAR SIZE PARAM may be four. When the correlation coefficient COR COEF is one, the particle size parameter PAR SIZE PARAM may be zero.

The particle size parameter generator 132 may generate the particle size parameter PAR SIZE PARAM based on the correlation coefficient COR COEF. In an example embodiment, the particle size parameter generator 132 may determine the particle size parameter PAR SIZE PARAM using a hyperbolic sine function of the correlation coefficient as following Equation 3.

$$\gamma = -\frac{2e^{\alpha(|\rho(R,B)|-0.5)} - 2e^{-\alpha(|\rho(R,B)|-0.5)}}{e^{0.5\alpha} - e^{-0.5\alpha}} + 2 \quad \text{[Equation 3]}$$

Herein, $\gamma$ is the particle size parameter PAR SIZE PARAM. $\rho(R, B)$ is the Pearson correlation coefficient between the red data and the blue data of the low frequency image LF IMAGE in Equation 2. $\alpha$ may be four. Equation 3 is obtained by an empirical method.

Figure 6:
FIG. 6 shows images illustrating red, green and blue data of a captured image in a foggy day.
Figure 6:
Figure 6:
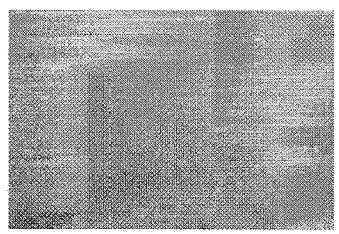
Figure 6:
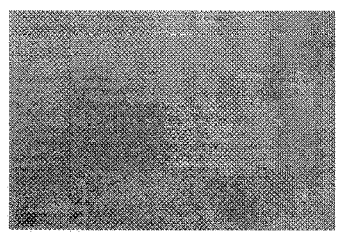

FIG. 6 shows images illustrating red, green and blue data of a captured image in a foggy day.

Referring to FIG. 6, a relation between a captured image I(x) corresponding to the x pixel coordinates and the real image J(x) corresponding to the x pixel coordinates is represented by Equation 4.

$$I(x)=w(x)J(x)+(1-w(x))A \quad \text{[Equation 4]}$$

Herein, A represents the atmosphere constant calculated from the whole captured image. Relation coefficient for the x pixel coordinate, w(x), represents a mixing ratio of light amount of the real image J(x) to light amount of the scattered light by the atmosphere, which is represented by the atmosphere constant A.

The relation coefficient w(x) is represented by a function of a scattering coefficient $\beta$ and a distance d(x) between the subject and the image capturing device according to Equation 5.

$$w(x)=e^{-\beta \cdot d(x)} \quad \text{[Equation 5]}$$

Herein, the scattering coefficient $\beta$ may be modeled with a wavelength $\lambda$ and the particle size parameter $\gamma$ by Rayleigh's law according to Equation 6.

$$\beta \propto \frac{1}{\lambda^\gamma} \quad \text{[Equation 6]}$$

Herein, the particle size parameter $\gamma$ may have a value between zero and four. The particle size parameter $\gamma$ may be an inverse proportion to the size of the particle. When the size of the particle increases, the particle size parameter $\gamma$ decreases to zero. When the particle size parameter $\gamma$ is zero, the scattering coefficient $\beta$ is not related with the wavelength $\lambda$.

FIG. 6 represents the captured image RGB FOGGY, which is captured in a foggy day. In the foggy day, the particle size parameter $\gamma$ is close to zero. In the foggy day, relatively big water droplets scatter the light so that the particle size parameter $\gamma$ is close to zero. When the particle size parameter $\gamma$ is close to zero, the wavelength $\lambda$ has almost no impact on the scattering coefficient $\beta$.

The captured image RGB FOGGY may be divided into the red data R FOGGY of the captured image RGB FOGGY, the green data G FOGGY of the captured image RGB FOGGY, and the blue data B FOGGY of the captured image RGB FOGGY. Herein, the red data R FOGGY, the green data G FOGGY and the blue data B FOGGY may have a similar contrast.

Figure 7:
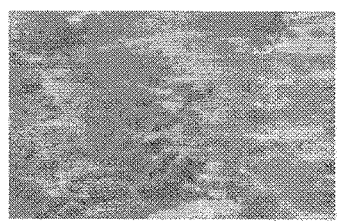
FIG. 7 shows images illustrating red, green and blue data of a captured image in a thin haze day.
Figure 7:
Figure 7:
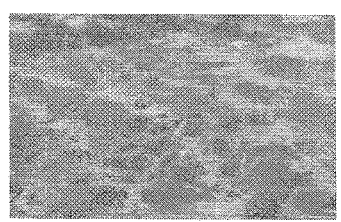
Figure 7:
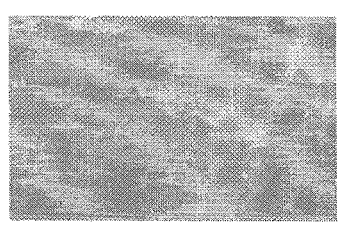

FIG. 7 shows images illustrating red, green and blue data of a captured image in a thin haze day.

FIG. 7 represents the captured image RGB THIN HAZE, which is captured in a thin haze day. In the thin haze day, the particle size parameter γ is close to four. In the thin haze day, relatively small water droplets scatter the light so that the particle size parameter γ is close to four. When the particle size parameter γ is close to four, the scattering coefficient β is in inverse proportion to the fourth power of the wavelength λ. Herein, for example, the wavelength $\lambda^R$ of the red light is 700 nanometers (nm). For example, the wavelength $\lambda^G$ of the green light is 520 nm; and the wavelength $\lambda^B$ of the blue light is 440 nm.

The captured image RGB THIN HAZE may be divided into the red data R THIN HAZE of the captured image RGB THIN HAZE, the green data G THIN HAZE of the captured image RGB THIN HAZE, and the blue data B THIN HAZE of the captured image RGB THIN HAZE. Herein, the red data R THIN HAZE, the green data G THIN HAZE and the blue data B THIN HAZE may be different from one another. The difference between the wavelength of the red data R THIN HAZE and the wavelength of the blue data B THIN HAZE is great, so that the difference between the contrast of the red data R THIN HAZE and the contrast of the blue data B THIN HAZE is great.

Figure 8:
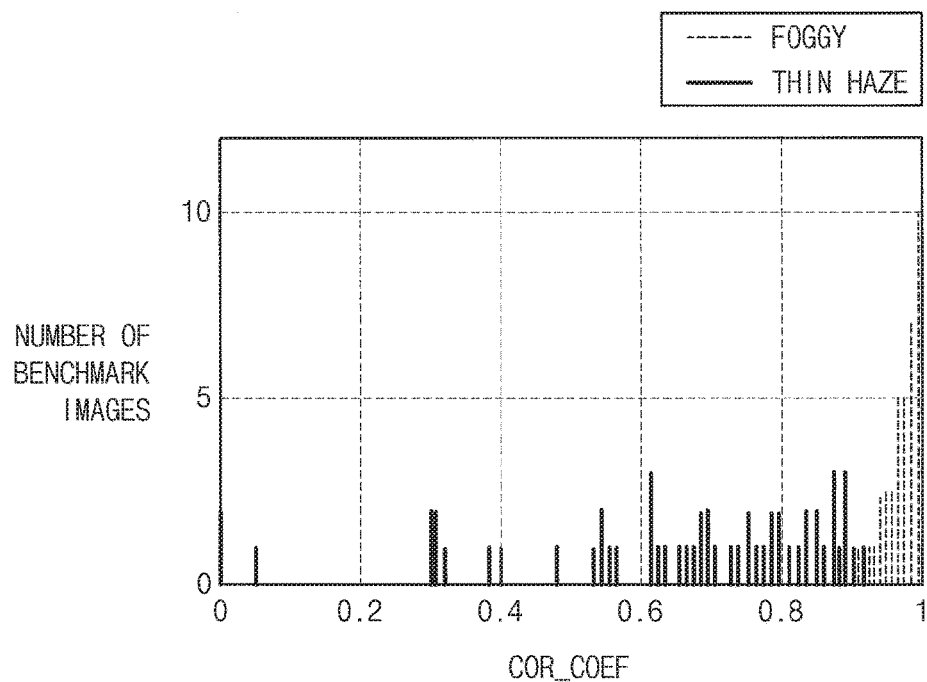
FIG. 8 is a graph illustrating correlation coefficients according to weather.

FIG. 8 is a graph illustrating correlation coefficients according to weather.

Referring to FIG. 8, the correlation coefficient COR COEF (ρ(R, B)) between the red data and the green data of the low frequency image LF IMAGE has a value close to one in the foggy day. The correlation coefficient COR COEF (ρ(R, B)) between the red data and the blue data of the low frequency image LF IMAGE has a value between zero and one in the thin haze day.

Figure 9:
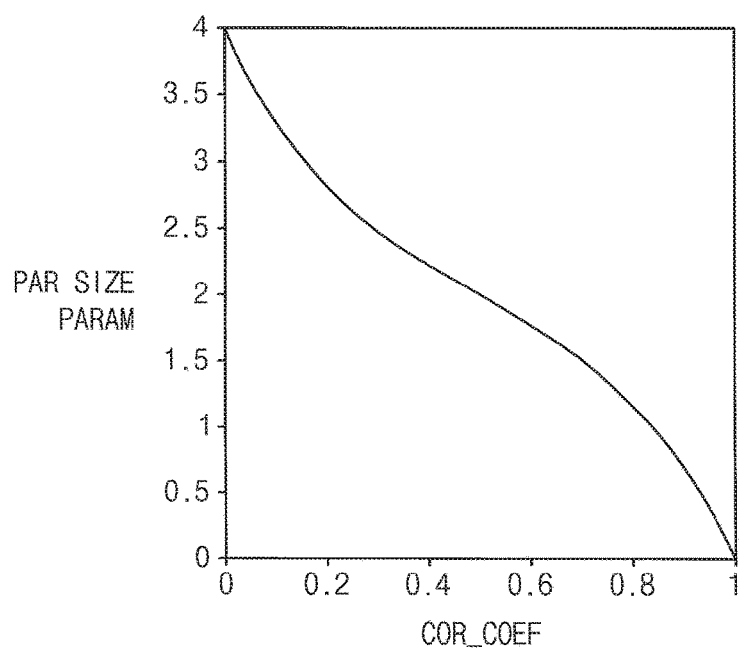
FIG. 9 is a graph illustrating a relationship between the correlation coefficient and particle size parameter.

FIG. 9 is a graph illustrating a relationship between the correlation coefficient and particle size parameter.

Referring to FIGS. 6 to 9, the particle size estimator 130 may estimate the particle size parameter using the Equation 3 from the correlation coefficient COR COEF (ρ(R, B)) between the red data and the blue data of the low frequency image LF IMAGE, which represents the similarity of the red data R THIN HAZE and the blue data B THIN HAZE.

The transmission coefficient divider 140 divides the transmission coefficient TC REF based on the particle size parameter to generate the first to third divided transmission coefficients TCR, TCG and TCB, which are respectively corresponding to the red, green and blue data of the captured image. In an example embodiment, the transmission coefficient divider 140 may generate the first to third divided transmission coefficients TCR, TCG and TCB according to Equation 7.

$$t_R(x) = e^{-\beta_R \cdot d(x)} = e^{-\frac{\alpha}{\lambda_R^\gamma} d(x)} = e^{-\frac{\alpha}{\lambda_G^\gamma} d(x)\left(\frac{\lambda_G}{\lambda_R}\right)^\gamma} = (t_G(x))^{\left(\frac{\lambda_G}{\lambda_R}\right)^\gamma} \quad \text{[Equation 7]}$$

$$t_G(x) = e^{-\beta_G \cdot d(x)} = e^{-\frac{\alpha}{\lambda_G^\gamma} d(x)}$$

-continued $$t_B(x) = e^{-\beta_B \cdot d(x)} = e^{-\frac{\alpha}{\lambda_B^\gamma} d(x)} = e^{-\frac{\alpha}{\lambda_G^\gamma} d(x)\left(\frac{\lambda_G}{\lambda_B}\right)^\gamma} = (t_G(x))^{\left(\frac{\lambda_G}{\lambda_B}\right)^\gamma}$$

The transmission coefficient divider 140 may output the second divided transmission coefficient TCG ($t_G(x)$) corresponding to the green data of the captured image. For example, the second divided transmission coefficient TCG ($t_G(x)$) may be the transmission coefficient TC REF. The transmission coefficient divider 140 may output the first divided transmission coefficient TCR ($t_R(x)$) corresponding to the red data of the captured image. The first divided transmission coefficient TCR ($t_R(x)$) may be generated by amending the second divided transmission coefficient TCG ($t_G(x)$) based on the particle size parameter γ using Equation 7. The transmission coefficient divider 140 may output the third divided transmission coefficient TCB ($t_B(x)$) corresponding to the blue data of the captured image. The third divided transmission coefficient TCB ($t_B(x)$) may be generated by amending the second divided transmission coefficient TCG ($t_G(x)$) based on the particle size parameter γ using Equation 7.

The real image estimator 150 may estimate the real image by applying the first to third divided transmission coefficients TCR, TCG and TCB to the red, green and blue data of the captured image, respectively, using Equation 8.

$$J_c(x) = \frac{I_c(x) - A_c}{t_c(x)} + A_c, \, c \in \{r, g, b\} \quad \text{[Equation 8]}$$

According to Equation (8), the real image estimator 150 may estimate the red data $J_R(X)$ of the real image based on the red data $I_R(x)$ of the captured image, the red atmosphere constant $A_R$ and the first divided transmission coefficient TCR ($t_R(x)$). The real image estimator 150 may estimate the green data $J_G(x)$ of the real image based on the green data $I_G(x)$ of the captured image, the green atmosphere constant $A_G$ and the second divided transmission coefficient TCG ($t_G(x)$). The real image estimator 150 may estimate the blue data $J_B(x)$ of the real image based on the blue data $I_B(x)$ of the captured image, the blue atmosphere constant $A_B$ and the third divided transmission coefficient TCB ($t_B(x)$).

When the correlation coefficient COR COEF increases, the size of the particle may increase. When the correlation coefficient COR COEF increases, the particle size parameter may decrease. When the correlation coefficient COR COEF increases, the differences among the first to third divided transmission coefficients may decrease.

In contrast, when the correlation coefficient COR COEF decreases, the size of the particle may decrease. When the correlation coefficient COR COEF decreases, the particle size parameter may increase. When the correlation coefficient COR COEF decreases, the differences among the first to third divided transmission coefficients may increase.

Figure 10:
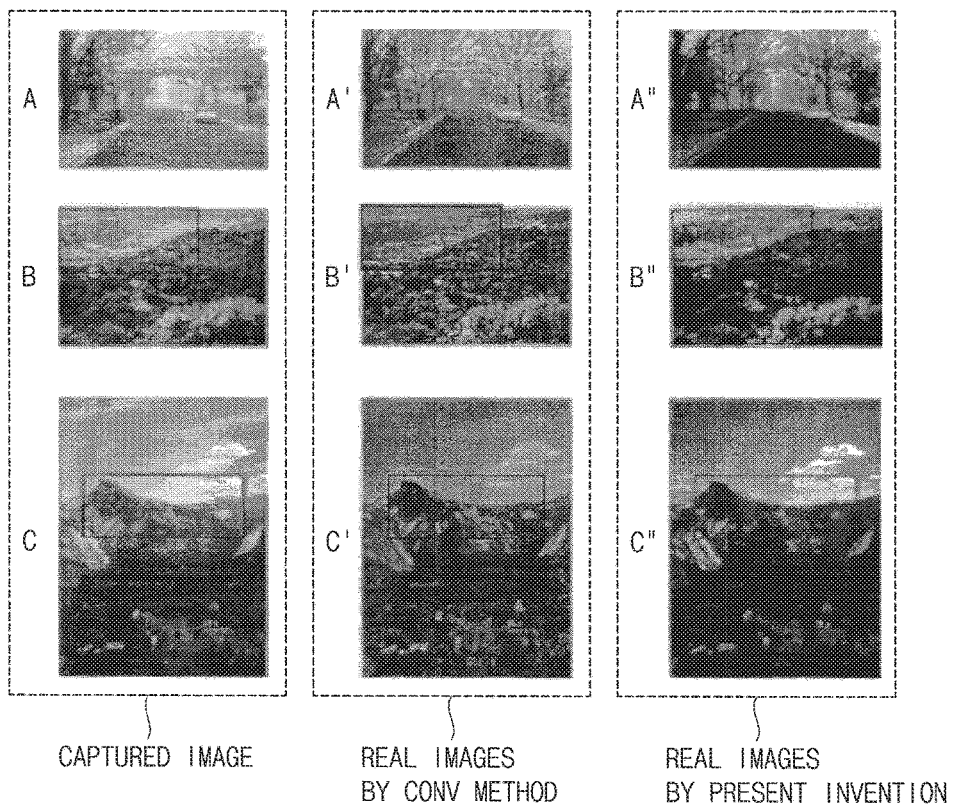
FIG. 10 is a conceptual diagram illustrating real images generated by the image haze removing apparatus of FIG. 1.

FIG. 10 is a conceptual diagram illustrating real images generated by the image haze removing apparatus of FIG. 1.

Referring to FIG. 10, first images A', B' and C' are real images generated from the captured image A, B and C by removing the haze using conventional methods. Second images A'', B'' and C'' are real images generated from the captured image A, B and C by removing the haze using methods of example embodiments of inventive concepts. In the second images A'', B'' and C'' more haze is removed than in the first images A', B' and C', thereby providing a better picture quality.

Figure 11:
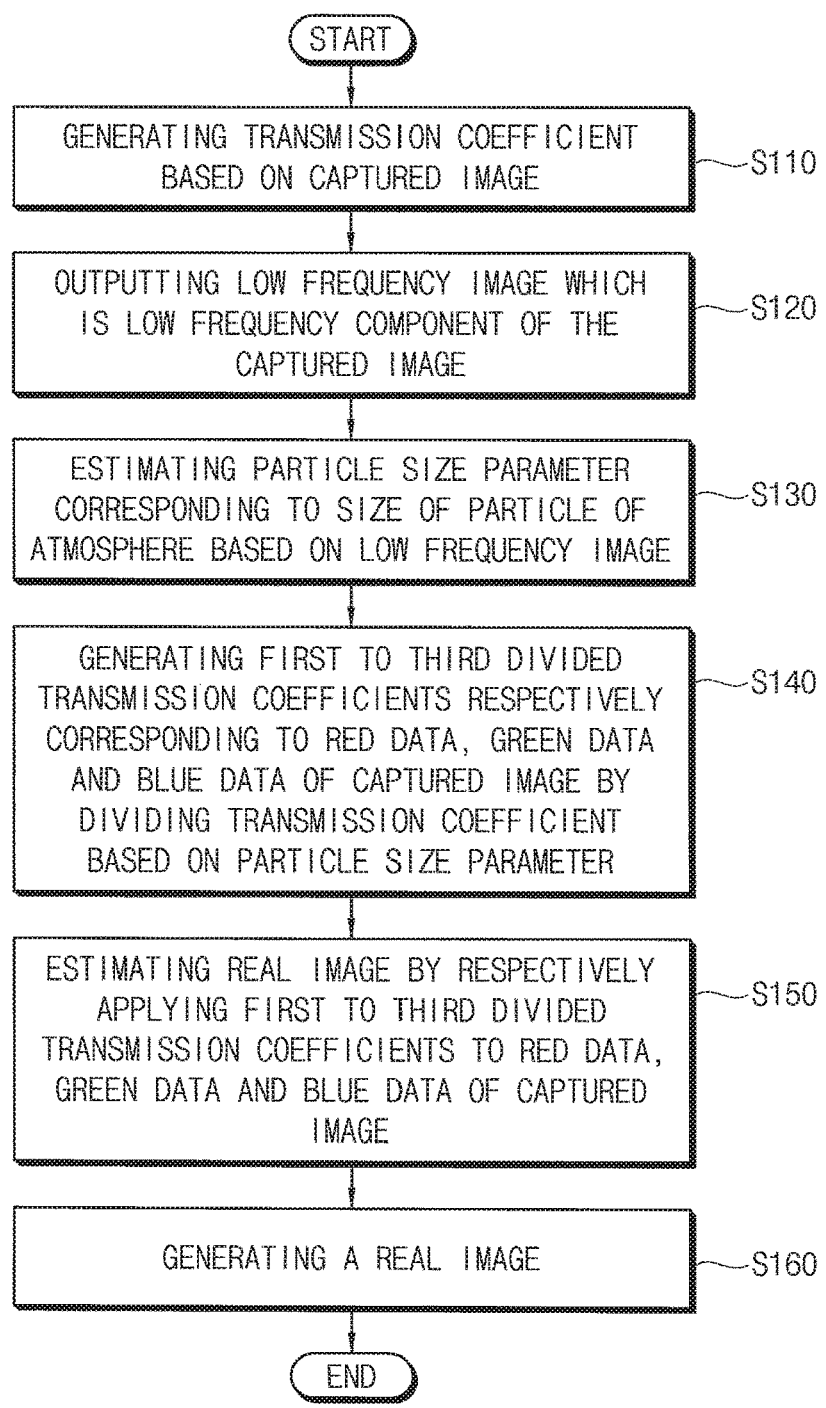
FIG. 11 is a flowchart diagram illustrating a method of removing an image haze according to an example embodiment.

FIG. 11 is a flowchart diagram illustrating a method of removing an image haze from a captured image according to an example embodiment. The method of FIG. 11 may be performed by the image haze removing apparatus 100.

Referring to FIG. 11, a method of removing the image haze from a captured image includes generating, at S110, a transmission coefficient based on a captured image, outputting, at S120, a low frequency image, the low frequency image being a low frequency component of the captured image; estimating, at S130, a particle size parameter. The particle size parameter corresponds to a size of a particle of an atmosphere when the captured image is captured based on the low frequency image.

Still referring to FIG. 11, the method of removing the image haze from a captured image further includes, generating, at S140, first to third divided transmission coefficients (TCR, TCG, TCB), wherein the first transmission coefficient TCR corresponds to the red data, the second transmission coefficient TCG corresponds to the green data, and the third transmission coefficient TCB corresponds to the blue data. At S140, the first to third divided transmission coefficients of the captured image are generated by dividing the transmission coefficient based on the particle size parameter. The method of FIG. 11, includes estimating, at S150, a real image by applying the first to third divided transmission coefficients (TCR, TCG, TCB) to the red data, the green data and the blue data of the captured image, respectively. Lastly, the method of FIG. 11 includes generating a real image based on the estimation of the real image at S160. Steps S100 to S160 refer to at least example embodiments disclosed in FIGS. 1 to 10. As such, the detailed explanation regarding steps S100 to S160 is omitted.

Figure 12:
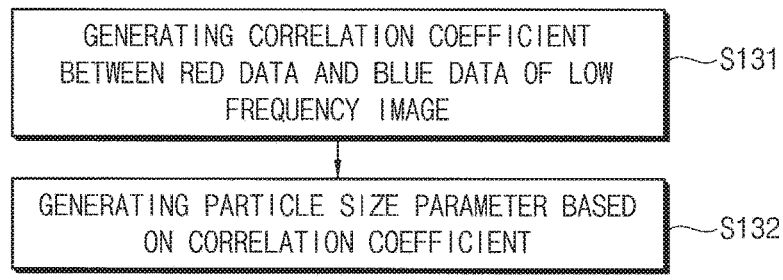
FIG. 12 is a flowchart diagram illustrating a step of estimating a particle size parameter of FIG. 11 according to an example embodiment.

FIG. 12 is a flowchart diagram illustrating the step of estimating the particle size parameter S130 of FIG. 11.

Referring to FIG. 12, at S130, estimating the particle size parameter corresponding to the size of the particle of atmosphere may include, (i) generating, at S131, the correlation coefficient between the red data and the blue data of the low frequency image; and (ii) generating, at S132, the particle size parameter based on the correlation coefficient. Steps S131 and S132 are performed by a particle size estimator in reference to FIGS. 6 to 9. As such, detailed explanation regarding S131 and S132 is omitted.

Figure 13:
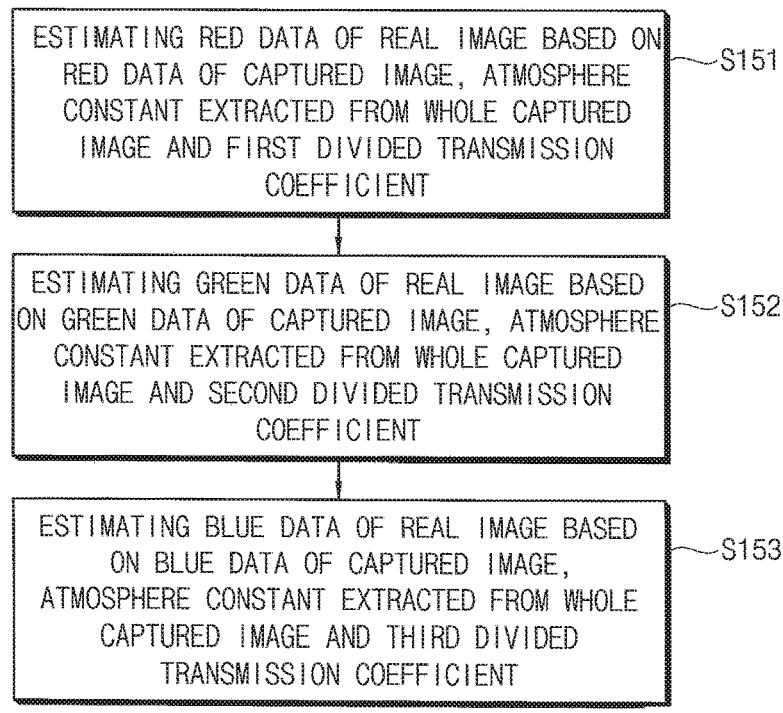
FIG. 13 is a flowchart diagram illustrating a step of estimating a real image of FIG. 11 according to an example embodiment.

FIG. 13 is a flowchart diagram illustrating the step of estimating the real image S150 of FIG. 11.

Referring to FIG. 13, at S150, estimating the real image may include, (i) estimating, at S151, the red data of the real image based on (a) the red data of the captured image, (b) the atmosphere constant extracted from the whole captured image and (c) the first divided transmission coefficient (TCR); (ii) estimating, at S152, the green data of the real image based on (a) the green data of the captured image, (b) the atmosphere constant extracted from the whole captured image and (c) the second divided transmission coefficient; and (iii) estimating, at S153, the blue data of the real image based on (a) the blue data of the captured image, (b) the atmosphere constant extracted from the whole captured image and (c) the third divided transmission coefficient. Steps S151 to S153 may be performed by a real image estimator, which refer to at least FIG. 9. As such, the detailed explanation and discussion regarding Steps S151 to S153 are omitted.

Figure 14:
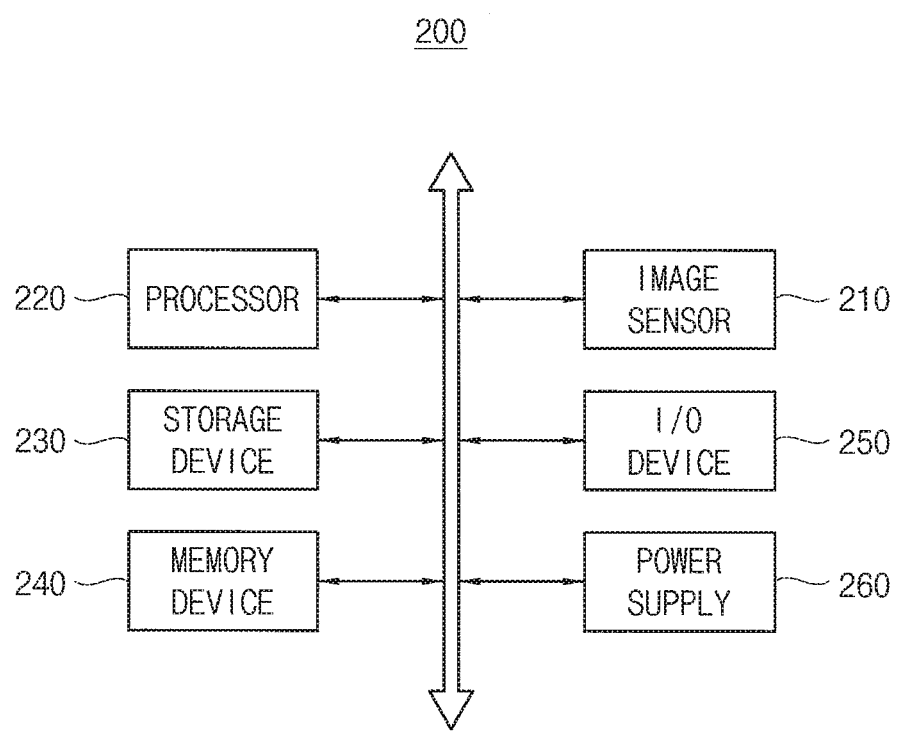
FIG. 14 is a block diagram illustrating a computing system according to example embodiments.

FIG. 14 is a block diagram illustrating a computing system according to example embodiments.

Referring to FIG. 14, a computing system 200 may include at least an image sensor 210, a processor 220 and a storage device 230.

The image sensor 210 generates a digital signal corresponding to an incident light. The storage device 230 stores the digital signal. The processor 220 controls operations of the image sensor 210 and the storage device 230.

The computing system 200 may further include at least a memory device 240, an input/output device (I/O device) 250 and a power supply 260. Although not illustrated in FIG. 14, the computing system 200 may further include at least ports that communicate with a video card, a sound card, a memory card, a universal serial bus (USB) device, and/or other electronic devices.

The processor 220 may perform various calculations or tasks. According to at least some example embodiments, the processor 220 may be a microprocessor or a central processing unit (CPU). The processor 220 may communicate with the storage device 230, the memory device 240 and the I/O device 250 via an address bus, a control bus, and/or a data bus. In at least some example embodiments, the processor 220 may be coupled to an extended bus, such as a peripheral component interconnection (PCI) bus.

The processor 220 may include at least the image haze removing apparatus 100 of FIG. 1 and/or may operate the method of removing the image haze of FIG. 11. In an example embodiment, the processor 220 may estimate the real image from the captured image by removing the haze of the captured image transmitted from the image sensor 210. The processor 220 may output the real image to the memory device 240 and/or the storage device 230.

The storage device 230 may include a flash memory device, a solid state drive (SSD), a hard disk drive (HDD), a CD-ROM and/or at least one nonvolatile memory device.

The memory device 240 may store data for operating the computing system 200. For example, the memory device 240 may be implemented with, including but not limited to, at least one volatile memory device, e.g., a dynamic random access memory (DRAM) device, a static random access memory (SRAM) device, etc., and/or at least one nonvolatile memory device, e.g., including but not limited to, an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc.

The I/O device 250 may include an input device (e.g., including but not limited to, a keyboard, a keypad, a mouse, etc.) and an output device (e.g., including but not limited to a printer, a display device, etc.). The power supply 260 may supply operation voltages for the computing system 200.

The image sensor 210 may communicate with the processor 220 via the bus or other communication links.

The image sensor 210 includes (i) a pixel array generating an analog signal based on an incident light, and (ii) an analog to digital converter generating a digital signal. The analog to digital converter generates a digital signal by operating sigma-delta analog to digital conversion, and cyclic analog to digital conversion in a first operation mode a single slope analog to digital conversion in a second operation mode.

The image sensor 210 may be packaged in various forms, such as including but not limited to, package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline integrated circuit (SOIC), shrink small outline package (SSOP), thin small outline package (TSOP), system in package (SIP), multi chip package (MCP), wafer-level fabricated package (WFP), or wafer-level processed stack package (WSP).

In some example embodiments, the image sensor 210 and the processor 220 may be fabricated as one integrated circuit chip. In other example embodiments, the image sensor 210 and the processor 220 may be fabricated as two separate integrated circuit chips.

The computing system 200 may be any computing system using an image sensor 210. For example, the computing system 200 may include but not limited to, a digital camera, a mobile phone, a smart phone, a portable multimedia player (PMP), a personal digital assistant (PDA), a personal computer, a server computer, a workstation, a laptop computer, a tablet computer, a digital television, a set-top box, a music player, a portable game console, a navigation system, etc.

Figure 15:
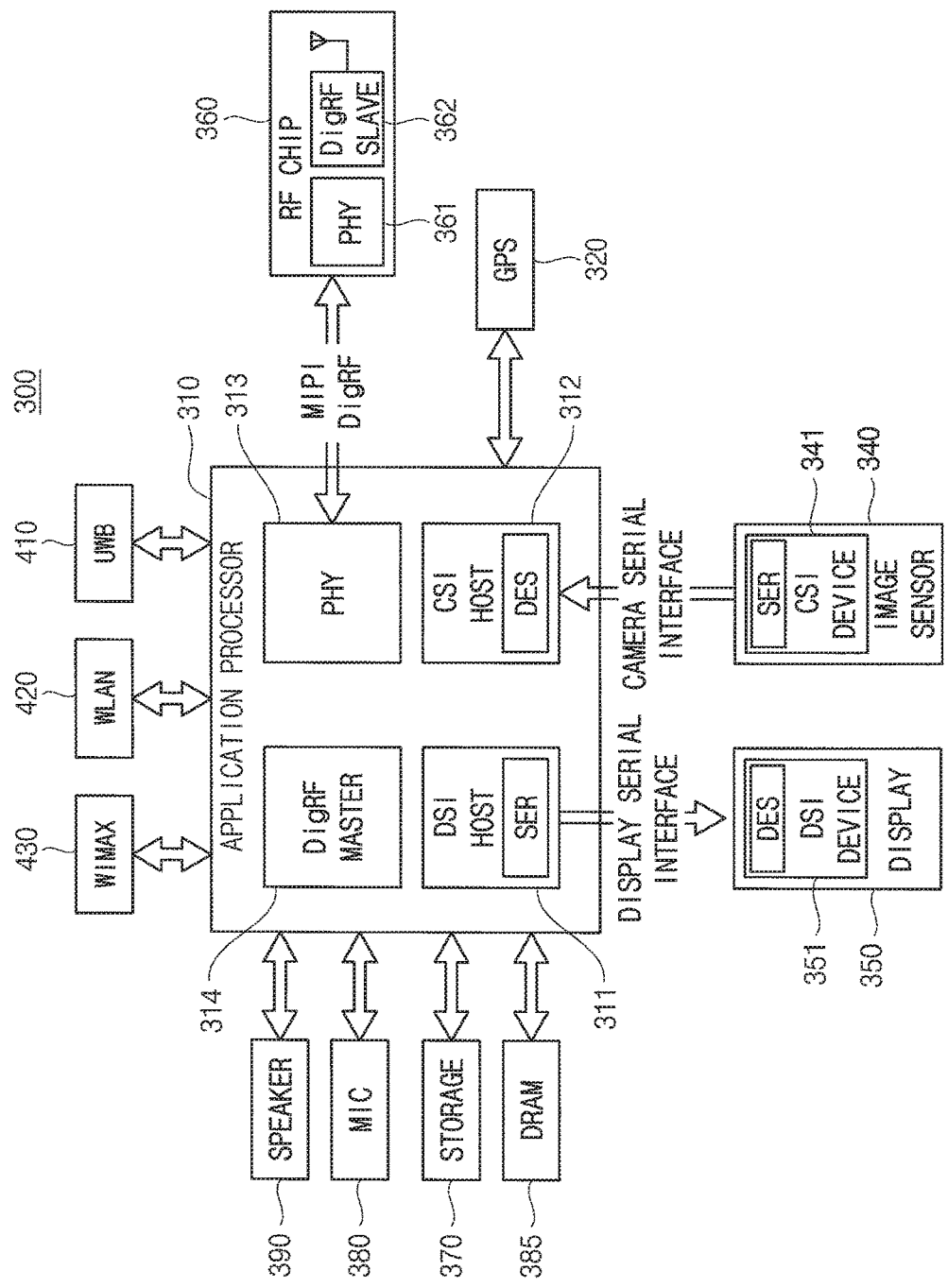
FIG. 15 is a block diagram illustrating a computing system interface according to example embodiments.

FIG. 15 is a block diagram illustrating a computing system interface according to example embodiments of inventive concepts.

Referring to FIG. 15, a computing system 300 may be implemented by a data processing device that uses or supports a mobile industry processor interface (MIPI) interface. The computing system 300 may include at least an application processor 310, an image sensor 340, a display device 350, etc.

A camera serial interface (CSI) host 312 of the application processor 310 may perform a serial communication with a CSI device 341 of the image sensor 340 via a CSI. In some example embodiments, the CSI host 312 may include a deserializer (DES), and the CSI device 341 may include a serializer (SER). A display serial interface (DSI) host 311 of the application processor 310 may perform a serial communication with a DSI device 351 of the display device 350 via a DSI. In some example embodiments, the DSI host 311 may include a serializer (SER), and the DSI device 351 may include a deserializer (DES). The application processor 310 may include at least the image haze removing apparatus 100 of FIG. 1 and/or may operate the method of removing the image haze of FIG. 11. In an example embodiment, the application processor 310 may estimate the real image by removing the haze of the captured image transmitted from the image sensor 340. The application processor 310 may output the real image to a DRAM device 385 or a storage 370.

Still referring to FIG. 15, the computing system 300 may further include a radio frequency (RF) chip 360 performing a communication with the application processor 310. A physical layer (PHY) 313 of the computing system 300 and a physical layer (PHY) 361 of the RF chip 360 may perform data communications based on a MIPI DigRF. The application processor 310 may further include a DigRF MASTER 314 that controls the data communications of the PHY 361. The RF chip 360 may further include a DigRF SLAVE 362 that is controlled through the DigRF MASTER 314.

The computing system 300 of FIG. 15 may further include a global positioning system (GPS) 320, storage 370, a microphone (MIC) 380, a DRAM device 385, and a speaker 390. In addition, the computing system 300 may perform communications using an ultra wideband (UWB) 410, a wireless local area network (WLAN) 420, a worldwide interoperability for microwave access (WIMAX) 430, etc. However, the structure and the interface of the computing system 300 are not limited thereto.

The transmission coefficient generator 110, transmission coefficient divider 140, real image estimator 150, particle size estimator 130, correlation coefficient generator 131, particle size parameter generator 132, processor 220, and the processor 310 may be implemented using hardware components, a processor executing software components, or a combination thereof. Upon execution of one or more algorithms, described in example embodiments of inventive concepts, the aforementioned hardware components, or processor executing software components, result in a special purpose processor.

Algorithms, as presented in example embodiments of inventive concepts, constitutes sufficient structure, that may comprise of, including but not limited to, mathematical formulas, flow charts, computer codes, and/or necessary steps, which upon execution result in a special purpose computer that is programmed to perform the disclosed algorithms in example embodiments of inventive concepts.

The one or more aforementioned processors are computer processing devices configured to carry out the program code by performing arithmetical, logical, and input/output operations. Once a program code is loaded into the one or more processors, the one or more processors may be programmed to perform the program code, thereby transforming the one or more processors into special purpose processor(s). Alternatively, or in addition to the processors discussed above, the hardware devices may include one or more Central Processing Units (CPUs), digital signal processors (DSPs), application-specific-integrated-circuits (ASICs), system on chips (SoCs), field programmable gate arrays (FPGAs), or the like. In at least some cases, the one or more CPUs, SoCs, digital signal processors (DSPs), application-specific integrated circuits (ASICs) and field-programmable gate arrays (FPGAs), may generally be referred to as processing circuits and/or microprocessors.

The above described example embodiments may be applied to an electronic device operating an image processing operation. For example, the electronic device may be a mobile phone, a smart phone, a PDA, a PMP, a digital camera, a personal computer, a server computer, a workstation, a laptop and a digital television.

The foregoing is illustrative of example embodiments of inventive concepts and is not to be construed as limiting thereof. Although a few example embodiments have been described, those skilled in the art will readily appreciate that many modifications are possible in example embodiments without materially departing from the novel teachings and advantages of inventive concepts. Accordingly, all such modifications are intended to be included within the scope of example embodiments of inventive concept as defined in the claims.

Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An image haze removing apparatus comprising:
    a transmission coefficient generator configured to generate an image transmission coefficient based on a captured image;
    a low pass filter configured to output a low frequency image based on the captured image, the low frequency image including a low frequency component of the captured image;

a particle size parameter estimator configured to estimate a particle size parameter based on the low frequency image, the particle size parameter corresponding to a size of a particle of an atmosphere;

a transmission coefficient divider configured to,
  divide the image transmission coefficient based on the particle size parameter, and
  generate a first divided image transmission coefficient corresponding to red data of the captured image, a second divided image transmission coefficient corresponding to green data of the captured image, and a third divided image transmission coefficient corresponding to blue data of the captured image; and a real image estimator configured to estimate a real image by applying the first divided image transmission coefficient to the red data of the captured image, applying the second divided image transmission coefficient to the green data of the captured image, and applying the third divided image transmission coefficient to the blue data of the captured image.

2. The image haze removing apparatus of claim 1, wherein the particle size estimator is configured to estimate the particle size parameter based on a correlation coefficient between red data of the low frequency image and green data of the low frequency image.

3. The image haze removing apparatus of claim 2, wherein, when the correlation coefficient increases,
  the particle size estimator is configured to decrease the particle size parameter, and
  the transmission coefficient divider is configured to decrease differences among the first divided image transmission coefficient, the second divided image transmission coefficient and the third divided image transmission coefficient.

4. The image haze removing apparatus of claim 2, wherein, when the correlation coefficient decreases,
  the particle size estimator is configured to increase the particle size parameter, and
  the transmission coefficient divider is configured to increase differences among the first divided image transmission coefficient, the second divided image transmission coefficient, and the third divided image transmission coefficient.

5. The image haze removing apparatus of claim 2, wherein the particle size estimator is configured to,
  (i) determine a value of the correlation coefficient to be between zero and one, and
  (ii) determine a value of the particle size parameter to be between zero and four.

6. The image haze removing apparatus of claim 1, wherein the particle size estimator is configured to,
  estimate the size of the particle of the atmosphere as a maximum value when the particle size parameter has a minimum value, and
  estimate the captured image is associated with a first type of day based on the size of the particle of the atmosphere being a maximum value.

7. The image haze removing apparatus of claim 1, wherein the particle size estimator is configured to,
  estimate the size of the particle of the atmosphere as a minimum value when the particle size parameter has a maximum value, and
  estimate the captured image is associated with a second type of day based on the size of the particle of the atmosphere being a minimum value.

8. The image haze removing apparatus of claim 1, wherein the particle size estimator comprises:

a correlation coefficient generator configured to generate a correlation coefficient between red data of the low frequency image and blue data of the low frequency image; and a particle size parameter generator configured to generate the particle size parameter based on the correlation coefficient.

9. The image haze removing apparatus of claim 8, wherein the correlation coefficient is a Pearson correlation coefficient between the red data of the low frequency image and the blue data of the low frequency image.

10. The image haze removing apparatus of claim 8, wherein the particle size parameter generator is configured to determine the particle size parameter using a hyperbolic sine function of the correlation coefficient.

11. The image haze removing apparatus of claim 1, wherein the low pass filter is configured to output the low frequency image using a discrete wavelet transform.

12. The image haze removing apparatus of claim 1, wherein the low pass filter is configured to output the low frequency image using a discrete cosine transform.

13. The image haze removing apparatus of claim 1, wherein the image transmission coefficient includes a plurality of pixel transmission coefficients, the plurality of pixel transmission coefficients corresponding to a plurality of pixel coordinates of the captured image, and
  at least one of the plurality of pixel transmission coefficients corresponding to at least one of the plurality of pixel coordinates based on pixel data of an area of the captured image, the area including the at least one of the plurality of pixel coordinates and an atmosphere constant extracted from the captured image.

14. The image haze removing apparatus of claim 1, wherein the real image estimator is configured to,
  estimate red data of the real image based on (i) the red data of the captured image, (ii) an atmosphere constant extracted from the captured image, and (iii) the first divided image transmission coefficient,
  estimate green data of the real image based on (i) the green data of the captured image, (ii) the atmosphere constant, and (iii) the second divided image transmission coefficient, and
  estimate blue data of the real image based on (i) the blue data of the captured image, (ii) the atmosphere constant, and (iii) the third divided image transmission coefficient.

15. A method of removing image haze, the method comprising:
  generating a transmission coefficient based on a captured image;
  outputting a low frequency image based on the captured image, the low frequency image including a low frequency component of the captured image;
  estimating a particle size parameter based on the low frequency image, the particle size parameter corresponding to a size of a particle of an atmosphere;
  dividing the transmission coefficient based on the particle size parameter to generate a first divided transmission coefficient, a second divided transmission coefficient and a third divided transmission coefficient, the first divided transmission coefficient corresponding to red data of the captured image, the second divided transmission coefficient corresponding to green data of the captured image, and the third divided transmission coefficient corresponding to blue data of the captured image; and estimating a real image by applying the first divided transmission coefficient to the red data of the captured image, applying the second divided transmission coefficient to the green data of the captured image, and applying the third divided transmission coefficient to the blue data of the captured image.

16. An apparatus for removing haze in an image, comprising:
a memory having computer readable instructions stored thereon; and
at least one processor configured to execute the computer readable instructions to,
receive a particle size parameter based on a correlation coefficient between at least two data points of a low frequency image of a captured image, the correlation coefficient corresponding to a size of a particle of an atmosphere,
generate a plurality of divided transmission coefficients of the captured image based on the received particle size parameter, the plurality of divided transmission coefficients corresponding to color data of the captured image, and
generate a real image of the captured image based on the divided transmission coefficients.

17. The apparatus of claim 16, wherein the plurality of divided transmission coefficients includes a first divided transmission coefficient corresponding to red data of the captured image, a second divided transmission coefficient correspond to green data of the captured image, and a third divided transmission coefficient corresponding to blue data of the captured image.

18. The apparatus of claim 17, wherein the at least one processor is further configured to,
estimate red data of the real image based on the red data of the captured image, an atmosphere constant extracted from the captured image, and the first divided transmission coefficient;
estimate green data of the real image based on the green data of the captured image, the atmosphere constant, and the second divided transmission coefficient; and
estimate blue data of the real image based on the blue data of the captured image, the atmosphere constant, and the third divided transmission coefficient.

19. The apparatus of claim 16, wherein the at least one processor is further configured to,
generate the particle size parameter based on the correlation coefficient between red data of the low frequency image and blue data of the low frequency image.

20. The apparatus of claim 16, wherein the correlation coefficient is a Pearson correlation coefficient between the at least two data points, the at least two data points include red data and blue data.

* * * * *